United States Patent [19]
Sheets

[11] Patent Number: 6,069,753
[45] Date of Patent: May 30, 2000

[54] FLIP-OUT SAFETY REFLECTOR

[76] Inventor: Clyde Roger Sheets, 1418 Poplar Dr. NE., Kalkaska, Mich. 49646

[21] Appl. No.: 09/257,465

[22] Filed: Feb. 24, 1999

[51] Int. Cl.$^7$ .............................. G02B 7/02; G02B 5/12; A47G 1/24; B61L 15/00

[52] U.S. Cl. .......................... 359/822; 359/549; 248/479; 116/30

[58] Field of Search ..................... 359/822, 515, 359/518, 519, 522, 523, 524, 549, 550, 833, 838; 40/903; D10/114; 180/271; 280/80

[56] References Cited

U.S. PATENT DOCUMENTS

| | | | |
|---|---|---|---|
| D. 246,444 | 11/1977 | Kitrell | D10/111 |
| 1,507,617 | 9/1924 | McWilliam | 40/591 |
| 1,846,794 | 2/1932 | Dandridge | 116/52 |
| 1,873,033 | 8/1932 | Reynolds | 116/52 |
| 2,153,634 | 4/1939 | Magarian | 359/534 |
| 2,243,472 | 5/1941 | Roan et al. | 340/487 |
| 2,949,058 | 8/1960 | Daly | 248/479 |
| 3,840,285 | 10/1974 | Vandermeer | 359/549 |
| 4,068,769 | 1/1978 | Sweet et al. | 214/83.18 |
| 5,696,484 | 12/1997 | Kim | 340/471 |
| 5,719,553 | 2/1998 | Lamparter | 340/433 |

*Primary Examiner*—Georgia Epps
*Assistant Examiner*—Saeed Seyrafi
*Attorney, Agent, or Firm*—Price, Heneveld, Cooper, DeWitt & Litton

[57] ABSTRACT

A highly reliable, manually deployable safety reflector device which can be easily installed on a vehicle includes a bracket and a reflector member mounted on the bracket for rotation between a storage position and a deployed position. The bracket or reflector member define a tubular sleeve, and the other of the bracket or reflector member include a shaft rotatably disposed in the sleeve. One of the sleeve or shaft includes a plurality of indentations, and the other of the sleeve or shaft includes a plurality of protuberances configured to project into and resiliently engage the plurality of indentations, whereby resilient engagement between the protuberances and the indentations lock the reflector member in one of the deployed or storage positions as desired.

11 Claims, 3 Drawing Sheets

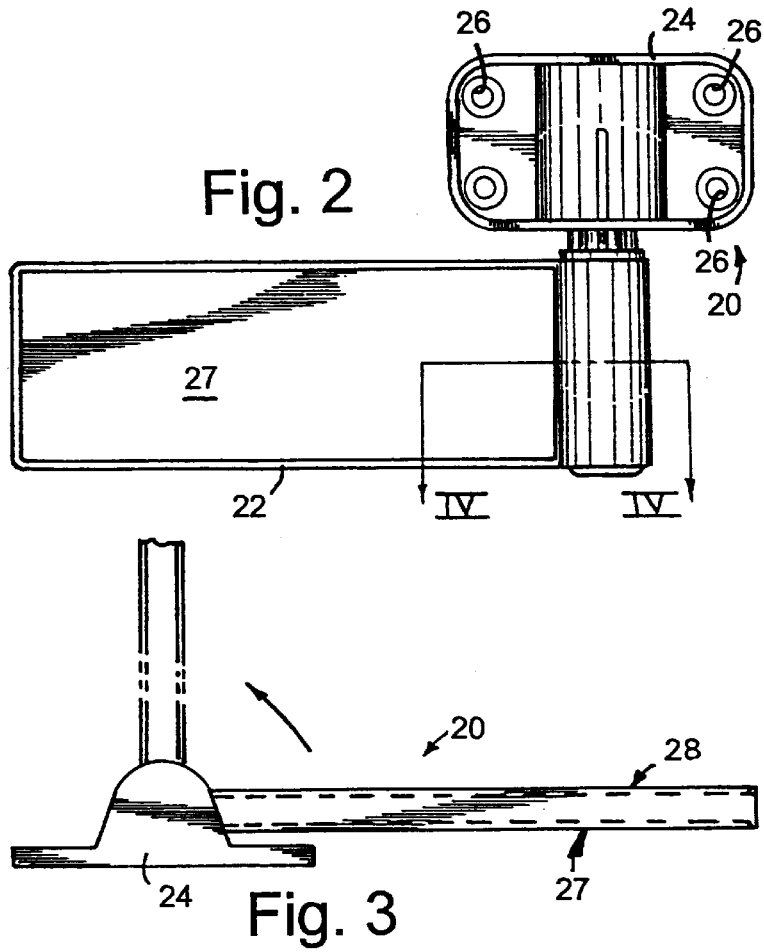
Fig. 2
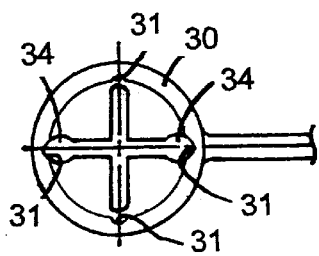
Fig. 3
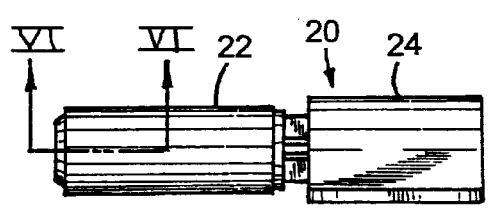
Fig. 4
Fig. 5
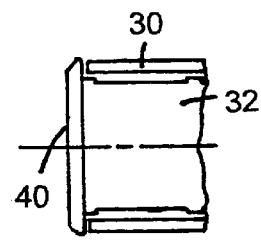
Fig. 6

6,069,753

FLIP-OUT SAFETY REFLECTOR

FIELD OF THE INVENTION

This invention relates to the field of safety devices for improving the visibility of stranded or parked vehicles at night, and more particularly to a safety reflector which can be mounted to a vehicle and deployed when the vehicle is parked.

BACKGROUND OF THE INVENTION

It is not uncommon for vehicles, even when they are well maintained, to experience mechanical difficulties which require the driver to pull over to the side of the road in order to get help or effect repairs. Drivers may also occasionally be required to park their vehicle in a poorly lighted area. When such events occur at night, it is often desirable to deploy some type of safety device which will improve the visibility of the vehicle and alert other drivers to the presence of the vehicle. Known safety measures have included simply leaving the lights of the vehicle on and/or utilizing the vehicles hazard flashers. However, such measures can drain the battery of the vehicle if it is not possible to quickly return to the vehicle or promptly effect repairs. Moreover, leaving the vehicle hazard lights or other lights on may not be an option if there is an electrical failure.

Other safety measures have included deployment of safety flares or battery powdered emergency lighting devices. However, safety flares burn out relatively quickly and, therefore, may be of little benefit if the vehicle is left unattended for a prolonged period of time. Further, it is undesirable, and potentially hazardous to deploy flares and leave them unattended, especially when the driver is merely parking the vehicle in a poorly lighted area. Battery powdered safety devices may not provide an adequate safety warning for other drivers, and are unreliable unless the batteries are frequently tested and replaced as necessary. Moreover, it can require a substantial amount of time to locate and deploy flares and/or battery powdered emergency lighting devices.

Accordingly, there is a need for a simple, reliable, easily deployed safety device for warning motorists of a parked or disabled vehicle on the side of a road or parked at a poorly lighted area.

SUMMARY OF THE INVENTION

This invention relates to a safety reflector device which can be mounted to a vehicle and which can be quickly and easily deployed when necessary to warn motorists of a parked or disabled vehicle. The safety reflector device includes a bracket and a reflector member mounted on the bracket for rotation between a storage position and a deployed position. Either the bracket or the reflector member define a tubular sleeve, and the other of the bracket or reflector member include a shaft which is rotatably deployed in the sleeve. Either the sleeve or the shaft include a plurality of indentations, and the other of the sleeve or shaft include a plurality of protuberances configured to project into and resiliently engage the plurality of indentations. The resilient engagement between the protuberances and the indentations lock the reflector member in either the deployed or storage position as desired.

In the event of an emergency at night, the safety reflector device can be easily deployed manually by simply rotating, or flipping, the reflector member from the storage position to the deployed position. The device has the advantage of being readily available, highly reliable, and quickly and easily deployable.

BRIEF DESCRIPTION OF THE DRAWINGS

FIG. 2 is a rear elevational view of the safety reflector device;

FIG. 3 is a top plan view of the safety reflector device;

FIG. 4 is an enlarged, fragmentary, cross-sectional view along lines IV—IV of FIG. 2, showing details of the safety reflector device;

FIG. 5 is an end view of the safety reflector device;

FIG. 6 is an enlarged, fragmentary, cross-sectional view along lines VI—VI of FIG. 5, showing details of the safety reflector device.

DESCRIPTION OF THE PREFERRED EMBODIMENTS

Figure 1:
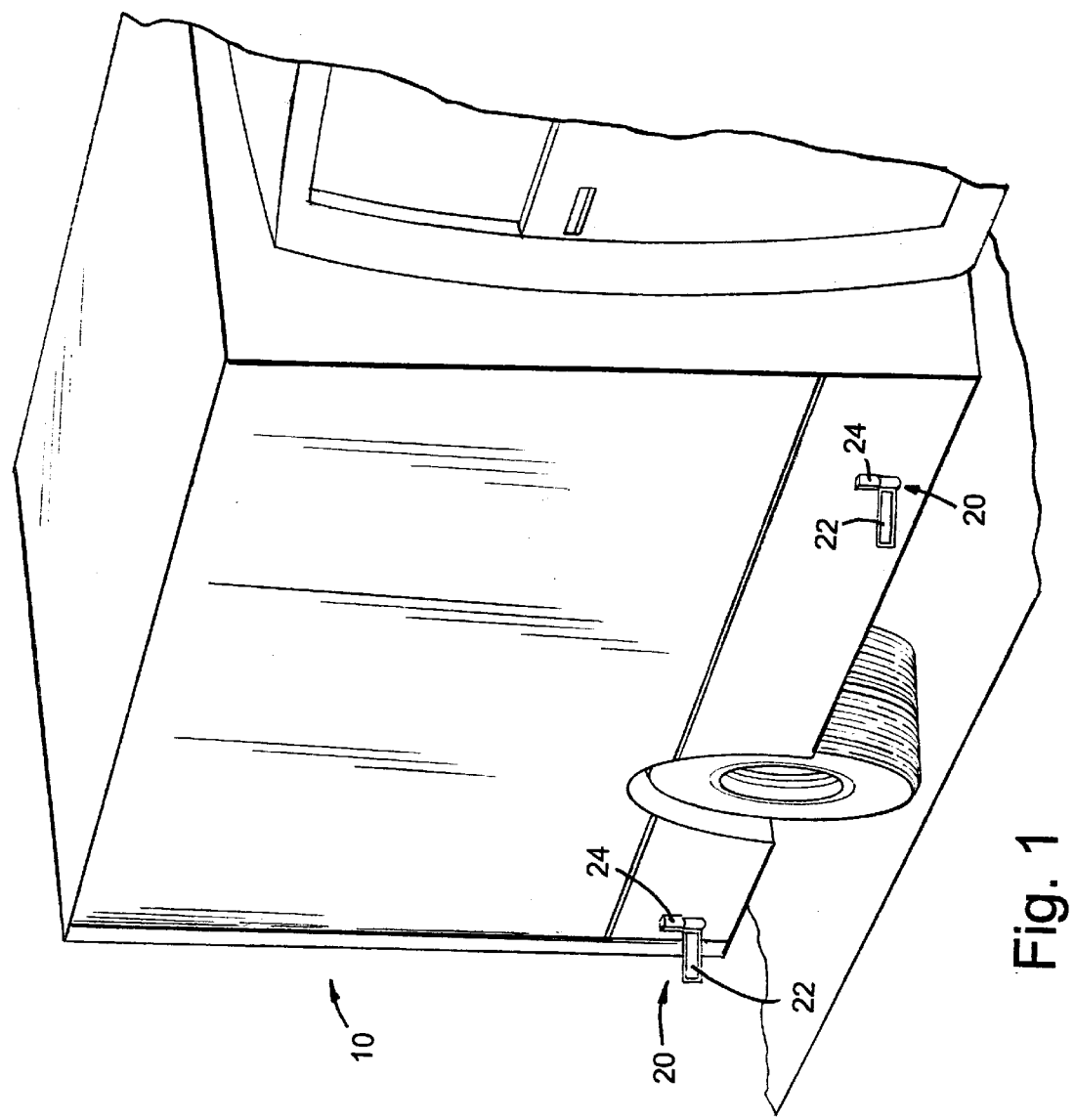
FIG. 1 is a perspective view of a truck having safety reflector devices in accordance with the invention mounted thereon.

FIG. 1 is a perspective view of a truck 10 including two safety reflector devices 20 installed thereon, one near the front of the cargo compartment, and one near the rear of the cargo compartment. Desirably, safety reflector devices 20 are also installed on the opposite side of the truck as well. The safety devices 20 in FIG. 1 are shown in the deployed position, with reflector members 22 projecting outwardly from the side of the cargo compartment at a right angle from the side wall thereof.

Referring to FIG. 2, the flip-out safety reflector device 20 includes a mounting bracket 24 having a plurality of apertures 26 for mounting safety reflector device 20 to a surface, such as the side of a truck. Reflector member 22 is rotatably mounted on bracket 24. Reflector member 22 includes reflective surfaces 27, 28 on opposite sides thereof. In the illustrated embodiment, reflective surfaces 27, 28 are provided by applying an adhesive backed reflective tape or film to each of opposite surfaces of reflector member 22. However, reflective surfaces can be provided in other ways, such as by applying a reflective paint or coating to the opposite surfaces of reflective member 22, such as by spraying or with a brush.

Figure 7:
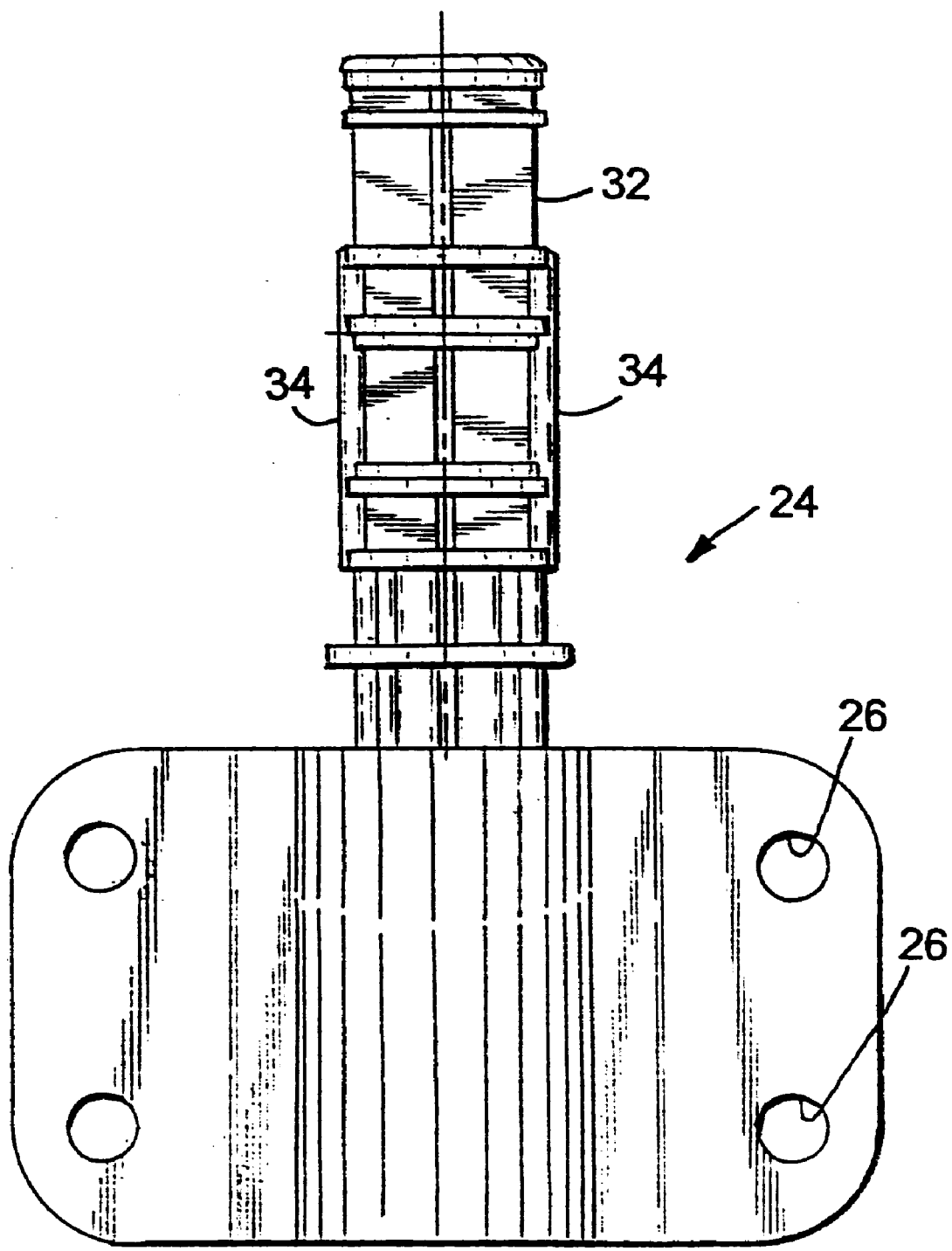
FIG. 7 is a front elevational view of the bracket portion of the safety reflector device.

As shown in FIGS. 3 and 4, reflector member 22 can be rotated with respect to bracket 24 between a first or storage position, as shown with solid lines in FIG. 3 wherein the reflector member 22 is longitudinally aligned parallel with the surface to which bracket 24 is mounted, and a second, deployed position in which the longitudinal direction of reflector member 22 is perpendicular with the surface to which bracket 24 is mounted, as shown with dashed lines in FIG. 3. As shown in greater detail in FIG. 4, reflector member 22 defines a tubular sleeve portion 30. Tubular sleeve portion 30 includes a plurality of indentations or grooves 31 disposed on the internal surface thereof. Integrally projecting from bracket 24 is a shaft 32 (FIG. 7). Shaft 32 is disposed in sleeve 30, with sleeve 30 being rotatable with respect to shaft 32. Extending along a portion of the length of shaft 32 are protuberances or projecting ribs 34 which are configured to resiliently engage the indentations or grooves 31 of sleeve 30. Ribs 34 and grooves 31 together provide a snap feature which securely retains reflector member 15 in a selected position, e.g., either parallel or perpendicular with the surface on which bracket 24 is mounted, i.e., in either a storage or deployed position, respectively. The snap feature allows the reflector member to be rotated and retained at a desired position. The amount of resistance against rotation provided by resilient engagement between the ribs 34 and grooves 31 is sufficient to prevent wind from rotating reflector member 22, but not so much as to prevent reflector member 22 from being easily rotated manually between the storage and deployed positions as desired.

Bracket 24 and reflector member 22 are preferably each made as a single molded part. Preferably, bracket 24 and reflector member 22 are injection molded from a plastic material which exhibits sufficient resilience to allow resilient engagement between grooves 31 and ribs 34. In the illustrated embodiment, ribs 34 extend longitudinally along the axis of the shaft, and grooves 32 extend longitudinally along the axis of the sleeve. However, it is possible that other types of indentations and protuberances can be used. For example, a hemispherical knob can project from shaft 32 and resiliently engage a dimple on the internal wall of sleeve 30 to provide the desired resilient, snap-type engagement between sleeve 30 and shaft 32 to lock reflector member 22 in a desired position.

The grooves or indentations 31 are angularly displaced along the inner circumference of the sleeve 30 by about 90°, whereby the deployed position of reflector member 22 is about perpendicular to the storage position.

Although the invention has been described with respect to a preferred embodiment in which sleeve 30 is an integral part of reflector member 22 and in which shaft 32 is an integral part of bracket 24, it will be recognized that these parts can be easily reversed, with the bracket defining a tubular sleeve portion, and with the reflector member including a shaft portion. Such reversal of parts is intended to be encompassed by the appended claims.

Further, it is also readily apparent that sleeve 30 can be provided with protuberances which engage recesses on shaft 32. Again, such mere reversal of parts is intended to be encompassed by the appended claims.

As shown in FIG. 6, shaft 32 includes an integral end cap 40 which retains sleeve 30, and hence reflective member 22 on bracket 24. During assembly, the peripheral edges of end cap 40 and/or sleeve 30 undergo a slight amount of resilient deformation, which allows shaft 32 to be inserted through sleeve 30. However, during assembly as end cap 40 emerges from the end of sleeve 30, the peripheral edges of end cap 40, and sleeve 30 assume their original shape, with the peripheral edges of end cap 40 projecting radially outwardly beyond the edges of sleeve 30 to prevent reflector member 22 from falling off of bracket 24.

Preferably, one side of the reflective member is provided with a red reflective surface, and the other side is provided with a white reflective surface. In particular, a red reflective tape can be applied to the rearwardly facing side of the reflector member 22 and a white reflective tape can be applied to the forwardly facing side of the reflector member to properly indicate the orientation of the vehicle when the reflector member is deployed.

The flip-out safety reflector device 20 can be easily mounted to the side of a truck, or to any other surface, using fasteners, such as screws. In the event of a night time emergency situation, wherein the truck driver is forced to stop his truck at the side of a road, the reflector member 22 can be easily flipped out as shown in FIG. 1 to enhance visibility of the vehicle, regardless of any additional safety measures which may be employed.

It will become apparent to those skilled in the art that various modifications to the preferred embodiment of the invention can be made without departing from the spirit or scope of the invention as defined by the appended claims.

The embodiments of the invention in which an exclusive property or privilege is claimed are defined as follows:

1. A safety reflector device comprising:
   a bracket and a reflector member mounted on the bracket member for rotation between a storage position and a deployed position, one of the bracket or reflector member defining a tubular sleeve, the other of the bracket or reflector member including a shaft rotatably disposed in the sleeve, one of the sleeve or shaft including a plurality of indentations, the other the sleeve or shaft including a plurality of protuberances configured to project into and resiliently engage the plurality of indentations, whereby resilient engagement between the protuberances and the indentations lock the reflector member in one of the deployed or storage positions as desired.

2. The device of claim 1, wherein the bracket is a one-piece molded part.

3. The device of claim 1, wherein the reflector member is a one-piece molded part.

4. The device of claim 1, wherein the reflector member and the bracket are each one-piece molded parts.

5. The device of claim 1, wherein the reflector member is a one-piece plastic part.

6. The device of claim 1, wherein the bracket is a one-piece plastic part.

7. The device of claim 1, wherein the reflector member and the bracket are each one-piece plastic parts.

8. The device of claim 1, wherein the indentations are ribs which extend longitudinally along the axis of the shaft or the sleeve and wherein the indentations are grooves which extend longitudinally along the axis of the shaft or the sleeve.

9. The device of claim 1, wherein the indentations are angularly displaced along the inner circumference of the sleeve or along the outer circumference of the shaft by about 90°, whereby the deployed position of the reflector member is about perpendicular to the storage position.

10. The device of claim 1, wherein a reflective film is secured to each of opposite sides of the reflector member.

11. The device of claim 10, wherein one of the reflective films is red and the other is white.

\* \* \* \* \*

UNITED STATES PATENT AND TRADEMARK OFFICE
CERTIFICATE OF CORRECTION

| | |
|---|---|
| PATENT NO. | : 6,069,753 |
| DATED | : May 30, 2000 |
| INVENTOR(S) | : Clyde Roger Sheets |

It is certified that error appears in the above-identified patent and that said Letters Patent is hereby corrected as shown below:

Column 1,
Line 27, "powdered" should be -- powered --;
Line 33-34, "powdered" should be -- powered --;
Line 38, "powdered" should be -- powered --;

Column 4, claim 1,
Line 22, after "other" insert -- of --.

Signed and Sealed this

Ninth Day of October, 2001

*Attest:*

NICHOLAS P. GODICI
*Attesting Officer*    Acting Director of the United States Patent and Trademark Office